Sept. 27, 1966  KUNIO BABA  3,275,780
APPARATUS FOR AUTOMATIC LOCKING AND RELEASING CORD REELS AND
AUTOMATIC CONNECTING AND DISCONNECTING OF THE
CORD ON THE REEL Filed May 27, 1965  4 Sheets-Sheet 1

INVENTOR.
Kunio Baba

BY Wenderoth,
Lind and Ponack,
attorneys

Sept. 27, 1966     KUNIO BABA     3,275,780
APPARATUS FOR AUTOMATIC LOCKING AND RELEASING CORD REELS AND
AUTOMATIC CONNECTING AND DISCONNECTING OF THE
CORD ON THE REEL Filed May 27, 1965     4 Sheets-Sheet 2

INVENTOR.
Kunio Baba

BY *Wenderoth,*
*Lind and Ponack*
*attorneys*

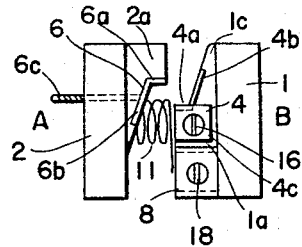

INVENTOR.
Kunio Baba

United States Patent Office 3,275,780
Patented Sept. 27, 1966

1

3,275,780
APPARATUS FOR AUTOMATIC LOCKING AND RELEASING CORD REELS AND AUTOMATIC CONNECTING AND DISCONNECTING OF THE CORD ON THE REEL
Kunio Baba, Tokyo, Japan, assignor of fifty percent, to Dearman Co., Ltd., Tokyo, Japan, a company of Japan
Filed May 27, 1965, Ser. No. 461,606
8 Claims. (Cl. 200—153)

This application is a continuation-in-part application of my applications Serial Nos. 265,267, 265,272 and 265,274, filed March 14, 1963.

The present invention relates to a spring-wound cord reel for use with an electrical appliance or apparatus, and in one aspect relates to a novel and improved means for automatic locking and releasing of the spring cord reel, and in another aspect relates to novel and improved means for automatic connecting and disconnecting of an electric cord on the reel at the time of locking and releasing of the reel.

Heretofore numerous types of spring-wound cord reels adapted for electrical appliances have been proposed and are now in use. It will be understood that an electric cord is indispensable for providing an electrical connection between a source of electric power and an electric machine to be operated by a user. However, it is known that the handling of the cord is often troublesome for the user. It is inconvenient for the user if the cord is too long or too short. Further, the manner of handling the cord after the use is also tedious. Spring-wound cord-controlled take-up reels have been developed as a solution to these problems.

However, one of the disadvantages encountered with the conventional cord reel of the above type lies in the means for locking and releasing the cord pulled from the reel at any desired position. A further disadvantage encountered with the conventional cord reel of the above type lies in the means for connecting and disconnecting the electric circuit to the cord on the word reel.

As is well known, the spring-wound cord reel performs its functions with the aid of a spiral tension spring, so the reel revolves many times in either direction according to whether the user is taking up or paying out the cord. Thus, the cord is always compelled to revolve around the reel in the same direction as that of the reel itself. If a single cord is relied on for rotating the cord reel, it will eventually be broken by twisting resulting from the rotation in either direction. Moreover, the cord has two ends, one connected to a source of elecetric power by means of, e.g., a wall socket or plug receptacle, and the other to the electrical machine to be used. The drum hub on which the cord is to be wound is required to revolve in either direction depending on whether the cord is to be wound up or unwound, while, on the other hand, the stationary outer cover is not allowed to revolve at all. This stationary cover is the part at which the electric energy is received from the cord and transmitted to the electric appliance. Therefore it is important to solve the problem of how to establish an electric connection between the rotating part and the stationary part. For convenience, let the contact of the rotating part be called a rotating contact, and that of the stationary part a stationary contact. In any spring-wound cord-controlled reel, the electrical connection of this stationary contact is a highly important matter.

Numerous methods and means have been proposed for transmitting electric energy from the rotating contact to the stationary contact of an electric machine to be operated. One of the universally adopted means is as follows: means including an electrical collector ring and a brush

2 is provided in operative juxtaposition to the reel, through which the electric energy can be supplied to the particular machine, whichever direction the rotating contact of the cord may be rotated. However, a serious defect encountered with the above collector ring and brush means is that there is an unavoidable loss of the contact metal resulting from friction since they are in contact during rotation.

The present invention is directed to an apparatus to overcome the disadvantages inherent in the conventional spring-wound cord reel, and briefly stated, a preferred embodiment thereof comprises an apparatus for automatic locking and releasing of the cord of the reel by the steps of engaging and disengaging a rotatable lock means in response to a sudden release and/or a slow release of the cord being pulled from the reel. More particularly, the novel and improved rotatable lock means of the invention is so small and compact that it can be accommodated in a relatively small space within the reel body, the volume of which will be substantially unchanged by the provision of the rotatable lock means.

It is, therefore, an object of the invention to provide a novel and improved spring-wound cord reel in which the novel rotatable lock means is installed in an outer portion of a drum hub of the reel.

It is another object of the invention to provide a cord reel in which the cord is held in any extended position automatically by a simple operation, such as, a sudden or slow release of the cord.

The present invention has a further object to overcome the disadvantages inherent in the contact means of conventional spring-wound cord reels, and the preferred embodiment of the invention also comprises an apparatus for automatically connecting and disconnecting the electric circuit of the cord reel by providing contact means in connection with the rotatable lock means in response to a quick release and/or a slow release of the cord being pulled from the reel.

It is another object of the invention to provide a cord reel in which the contact metal loss due to friction is minimized because the contacts are connected only in the locked condition of the cord, that is, when the cord is at a standstill.

It is still another object of the invention to provide a cord reel which will be simple in construction and easy to mass produce as well as having a high efficiency and a high dependability.

Numerous other objects and advantages of the invention will be apparent from the following description, which, taken in connection with the accompanying drawings, discloses several preferred embodiments thereof.

In the drawings:

FIG. 17 is a schematic side view, on a reduced scale, of a part of a modified embodiment of the apparatus of the invention, showing the electric contacts of the apparatus of this embodiment in the unlocked position;

FIG. 18 is also a schematic side view similar to FIG. 17, showing the electric contacts in the locked position;

FIG. 19 is another schematic side view similar to FIG. 1, showing the electric contacts in the released position;

FIG. 20 is a plan view of the inner face of a stationary outer cover 2″.

FIG. 21 is a plan view of the rotatable lock means;

FIG. 22 is a plan view of the recessed face of the drum hub of the cord reel of this embodiment;

Figure 6:
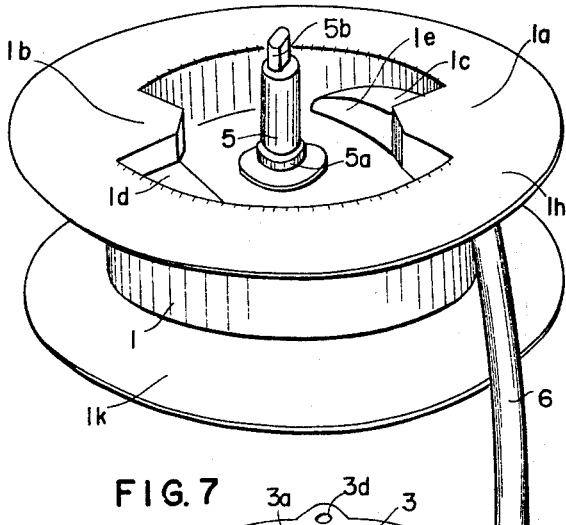
FIG. 6 is a perspective view of the reel body.
Figure 3:
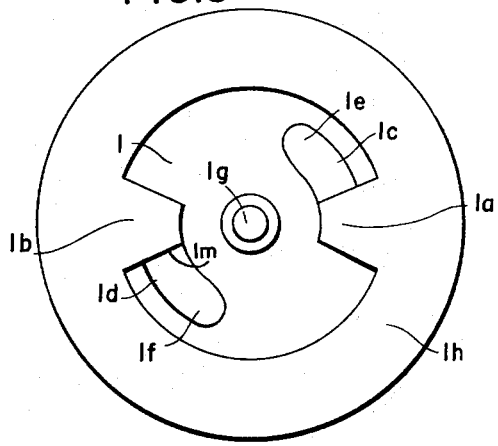
FIG. 3 is a top plan view of the reel showing the circular recess provided on the outer side of the hub of the reel.
Figure 7:
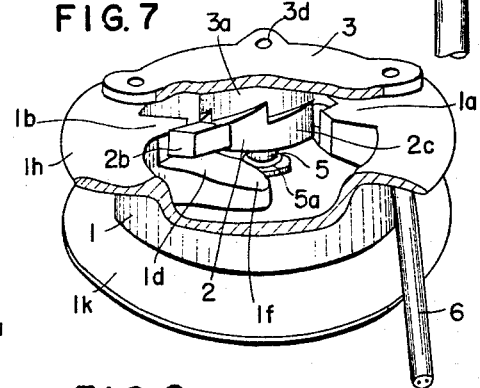
FIG. 7 is a perspective view, partly broken away, of the apparatus with the parts in the locked condition.
Figure 4:
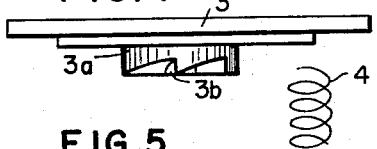
FIG. 4 is a side elevation view of the stationary plate of FIG. 1.
Figure 5:
FIG. 5 is a perspective view of the rotatable lock member of FIG. 2.
Figure 8:
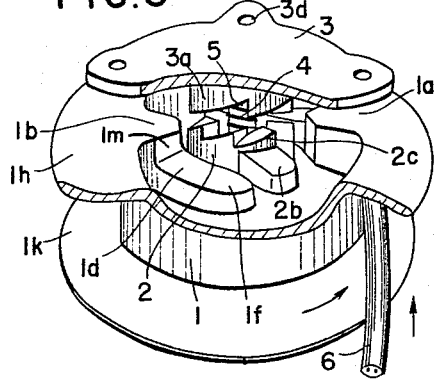
FIG. 8 is a perspective view, partly broken away, of the apparatus with the parts in the unlocked condition.

Referring to FIGS. 4–6 inclusive, the novel and improved cord reel of the invention comprises a rotatable drum hub 1, a rotatable lock member 2, a stationary plate 3, a helical spring 4, and a central shaft 5. An assembled cord reel is shown in FIGS. 7–8. As shown in FIGS. 3 and 6, a pair of projecting elements 1a and 1b which are diametrically opposed to each other extend into the circular recess in the drum hub 1 of the reel from an end face of the hub in the bottom of the recess. These members each have the same shape, but extend into the circular recess in opposite directions. Because their functions are also equivalent, a description of either element 1a or 1b will suffice. The element 1a has two portions 1c and 1e, the portion 1c being inclined upwardly out of the recess and in a direction opposite to the winding direction of the hub, and the portion 1e being an entrance surface, the part of the projection having surface 1a being wedge-shape. The portion 1e is for leading the rotatable locking member 2 onto the adjacent inclined portion 1c.

A central shaft 5 extends through a central hole 1g of the drum hub to rotatably mount the hub 5. A pair of flange plates 1h and 1k are integral with the drum hub 1 to accommodate the cord 6.

Figure 2:
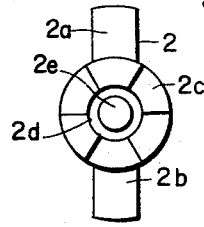
FIG. 2 is a top plan view of a rotatable lock member.

The rotatable lock member 2 is freely rotatably mounted in shaft 5 on a seat 5a provided around the central shaft 5 with the shaft extending through hole 2e. As shown in FIGS. 2 and 5, the rotatable locking member 2 is in the form of a bar having an expanded portion at the middle thereof, two arms 2a and 2b being on opposite ends thereof. A seat 2d around the central hole 2e of the rotatable locking member 2 holds a helical spring 4 between the seat 3b of the stationary plate 3 and the seat 2d. This spring 4 urges the locking member 2 away from plate 3 toward the circular recess of the drum hub 1.

The rotatable locking member 2 is provided with abutment means in the form of a plurality of pawl-like teeth 2c having a circular portion on one side thereof as clearly shown in FIG. 5, and six pawl-like teeth are illustrated in FIG. 2. It will be understood that the number of pawl-like elements is not critical. The rotatable locking member 2 is preferably of synthetic plastic or some other insulating material so that it can be molded as an integral unit with pawl-like teeth 2c.

An abutment means in the form of a plurality of pawl-like teeth 3a similar to those of the rotatable locking member 2 are provided on the inner side of the stationary plate 3. The pawl-like teeth 2c of the rotatable locking member 2 are engageable with teeth 3a of the stationary plate 3.

Figure 1:
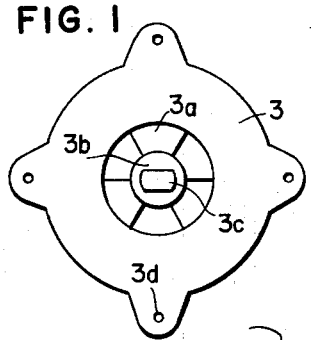
FIG. 1 is a top plan view of a stationary plate, showing the inner side thereof.

A plurality of holes 3d, shown in FIG. 1, are provided so that the stationary plate 3 can be affixed to a stationary support by screws extending through the plate. As is usual in a spring-wound cord reel, a spiral take-up tension spring (not shown) is mounted in the drum hub 1 so that one end of the spring is fastened to the drum hub 1 and the other end thereof anchored to the central shaft 5. It will be understood that the rotatable locking member 2, and the drum hub 1 are rotatably mounted on the central shaft 5.

The rotatable locking member 2 is movable along the central shaft 5 up and down and is also rotatable around the same shaft 5 in either direction.

In operation, when it is desired that the cord 6 pulled from the drum hub 1 should be locked in any appropriate position, the cord 6 is pulled quickly and is released again suddenly. As a result, the reel 1 revolves in a direction entirely opposite to the pulley direction under the tension of the take-up spring (not shown) housed in the drum hub 1 so that the inclined portion of the projection 1a (and also 1b) will slide under the arm 2a (and also 2b) with the smooth and inclined entrance portion 1e (and also 1f) acting as a guide, and will wedge the arm 2a along the shaft 5 toward stationary plate 3, and the rotatable member 2 together with the arm 2a will be further wedged on the inclined portion 1c of projection 1a. This is because the inertia of locking member 2 causes it to remain still or rotate in one direction while the hub rotates in the other direction when it is suddenly released.

Further, as the rotatable locking member 2 is wedged by the inclined portion of projection 1a (and also projection 1b during the rotation of the reel, the pawl-like teeth 2c on the rotatable locking member 2 will approach the pawl-like teeth 3a on the stationary plate 3. Finally, overcoming the urging of the helical spring 4, both sets of pawl-like teeth will be engaged with one another. As a result, the rotation of the reel is completely suspended by the firm engagement of both sets of pawl-like teeth 2c and 3a, which is clearly shown in FIG. 7. Thus, the cord 6 is locked in any extended position.

Next, in taking up the cord 6 onto the reel, the cord is pulled a little in the pulling direction and released slowly. Then the drum hub 1 will recede into the position where the hub 1 is spaced from the position in which the rotatable locking member 2 is urged towards the stationary plate 3 so that under the influence of spring 4 the arm 2a (and 2b) of the rotatable locking member 2 will slide down the projection 1c and its adjoining inclined entrance portion 1e and the rotatable locking member 2 will return to its original seat 5a at the bottom of the shaft 5.

Accordingly, when the cord 6 is pulled a little, and then, released or taken up slowly, the rotatable locking member 2 occupies a stable position at the seat 5a at the bottom of the shaft 5 so that the arm 2a (or 2b) of the rotatable lock 2 will not move onto the inclined entrance portion 1e (of 1f), because the reverse or taking up rotation of the drum hub 1 is not so sudden as to push the arm of the locking member 2 towards the projection portion 1c (or 1d), although the locking member 2 is introduced onto the inclined entrance portion 1e (or 1f). Thus, the rotatable locking member 2 is urged towards the circular recess of the drum hub 1 by the tension of the helical spring 4 and the locking member 2 with the arms 2a and 2b is brought into the reverse or taking-up rotation. Consequently, the cord 6 is safely taken-up by the reel owing to the proper taking up operation of the drum hub 1, which is clearly shown in FIG. 8.

As fully described in the foregoing, the control of the spring-wound cord reel, such as, locking and taking-up of the cord, can be effected safely in an automatic manner without recourse to any mechanism or apparatus positioned on the outside of the cord reel by the simple operation of a sudden and/or slow release of the cord together with the tension of the spiral spring house in the drum hub of the cord reel.

Figure 12:
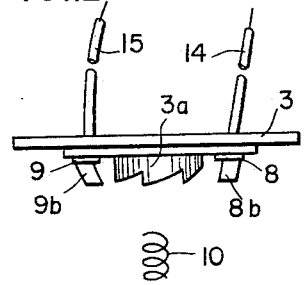
FIG. 12 is a side view of the stationary outer cover of FIG. 9.
Figure 13:
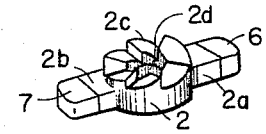
FIG. 13 is a perspective view of the rotatable conductor means of FIG. 10.
Figure 14:
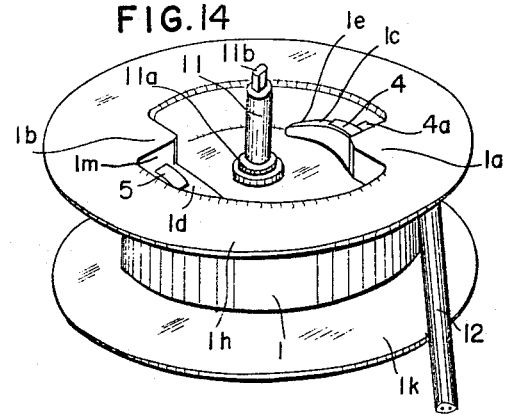
FIG. 14 is a perspective view of the reel body of FIG. 11.

Referring to FIGS. 12-14 inclusive, an embodiment of the novel and improved cord reel of this invention similar to that of FIGS. 1-8 comprises a rotatable drum hub 1', on which the cord 12' is wound, rotatably mounted on a central shaft 11', a rotatable conductor means 2', a stationary plate', electric contacts 4' and 5' affixed to the rotatable conductor member 2', electric contacts 8' and 9' affixed to the stationary plate 3', and a helical spring 10'.

Figure 11:
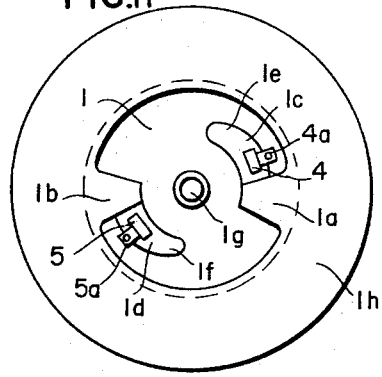
FIG. 11 is a top plan view of the reel for use with the cover of FIG. 9 and showing the circular recess provided on the outer side of the drum hub of the reel.

As shown in FIGS. 11 and 14, a pair of projecting elements 1a' and 1b' which are diametrally opposed to each other extend into the circular recess in the drum hub 1' of the reel from the end face of the hub which forms the bottom of the recess. These elements each have the same shape, but extend into the circular recess in the same rotational direction. Because their functions are also equivalent, a description of either 1a' or 1b' will suffice. The elements 1a' has two portions 1c' and 1e', the portion 1c' being inclined upwardly out of the recess in a direction opposite to the winding direction of the hub, and the portion 1e' being an entrance surface, the part of the projection having the surface 1e' being wedge-shaped. The portion 1e' is for leading the rotatable conductor member 2' onto the adjacent inclined portion 1c'. In addition, the inclined portion 1c' has an electric contact member 4' thereon. The upper surface of the contact 4' is adapted to come into contact with a conductor 6' or 7' on the rotatable conductor means 2', and a lug 4a' projects laterally from the contact 4' to provide a connection with the cord 12'. The elements each have a portion 1m' on the end thereof perpendicular to the end face of the reel.

A central shaft 11' extends through a central hole 1g' of the drum hub to rotatably mount the hub, and a pair of flange plates 1h' and 1k' are integral with the drum hub 1' to accommodate the cord 12'.

Figure 10:
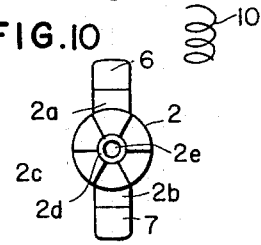
FIG. 10 is a top plan view of a rotatable conductor means for use with the cover of FIG. 9.

The rotatable conductor means 2' is freely rotatably mounted on shaft 11' on a seat 11a' provided around the central shaft 11' with the shaft extending through the hole 2e'. As shown in FIGS. 10 and 13, the rotatable conductor means 2' is the form of a bar having an expanded portion at the middle thereof, two arms 2a' and 2b' being on opposite ends thereof, the same as the rotatable lock member of FIGS. 2 and 5. Further, the end of each of the arms 2a' and 2b' is an electric conductor 6' or 7', respectively. A seat 2d' around the central hole 2e' of the rotatable conductor member 2' holds the helical spring 10' between the seat 2d' and the seat 3b' of the stationary plate 3', which spring urges the rotatable conductor 2' towards the circular recess of the drum hub 1' and away from stationary plate 3'.

The rotatable conductor and lock member 2' is provided with abutment means in the form of a plurality of pawl-like teeth 2c' on one side thereof as clearly seen in FIG. 13. Six pawl-like elements are illustrated in FIG. 10. It will be understood that the number of pawl-like elements is not critical. The rotatable conductor and lock member 2' is preferably of synthetic plastic or some other insulating material so that it can be molded as an integral unit with pawl-like teeth 2c'.

The stationary plate 3' is affixed to the shaft 11' at the end 11b' thereof, the end 11b' extending through the central hole 3c', and the stationary plate 3' is also provided with a plurality of pawl-like teeth 3a' similar to those on the rotatable conductor and lock member 2' on the inner side thereof. The pawl-like teeth 2c' on the rotatable conductor and lock member 2' are adapted to be engaged with the teeth on the stationary plate 3'. In addition, electric contacts 8' and 9' are affixed around the outside of pawl-like teeth 3a' by means of eyelets 13'. Lugs 8a', 8b' and 8c' and other lugs 9a', 9b' and 9c' are provided on the contacts 8' and 9', there being one lug corresponding to each tooth, the lugs being adapted to be contacted by the conductors 6' and 7' on the rotatable member 2' (see FIGS. 9 and 12).

Figure 9:
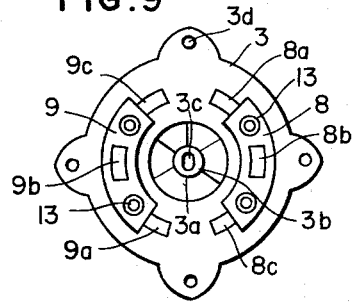
FIG. 9 is a top plan view of a stationary outer cover of an embodiment like that of FIGS. 1–8 and having electrical contact means as a part thereof, and showing the inner side thereof.

A plurality of holes 3d', shown in FIG. 9, are provided in the periphery of the stationary plate 3' so that plate 3' can be fastened to a suitable support. As is usual in a spring-wound cord reel, a spiral take-up tension spring (not shown) is mounted in the drum hub 1' so that one end of the spring is fastened to the drum hub and the other end thereof anchored to the shaft 11'. It will be understood that the rotatable conductor member 2' and the drum hub 1' are rotatably mounted on the central shaft 11'. Further, the rotatable conductor member is movable along the shaft 11' up and down and is rotatable around it in either direction.

In operation, when it is desired that the cord 12' pulled from the drum hub 1' should be locked and energized in any appropriate position, the cord 12' is pulled suddenly a little and is released again quickly. As a result, the reel 1' revolves in a direction entirely opposite to the pulling direction under the tension of the take-up spring (not shown) housed in the drum hub 1' so that the inclined portion 1c' of the projection 1a' (and also 1d' of 1b') will slide under the arm 2a' (and also 2b') with the smooth and inclined entrance portion 1e' (and also 1f') acting as a guide, and will wedge the arm 2a' along the shaft 11' toward the stationary plate, and rotatable member 2' together with the arm 2a' will be further wedged on the inclined portion 1c'. This is because the inertia of rotatable member 2' causes it to remain still or rotate in one direction while the hub rotates in the other direction when it is suddenly released.

Figure 15:
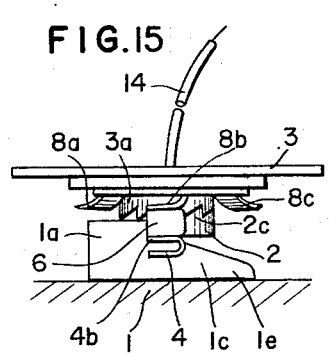
FIG. 15 is a side view, partly broken away of the apparatus of FIGS. 9–14 with the parts in the connected condition.

Further, as the rotatable member 2' is wedged by the inclined portion of projection 1a (and also projection 1b') during the rotation of the reel, the pawl-like teeth 2c' on the rotatable member 2' will approach the pawl-like teeth 3a' on the stationary plate 3'. Finally, overcoming the urging of the helical spring 4', both sets of pawl-like teeth will be engaged with one another. As a result, the rotation of the reel is completely suspended by the firm engagement of the pawl-like teeth 2c' and 3a', which is clearly shown in FIG. 15.

At this time, the underside of the conductor 6' (or 7') secured to the arm 2a' (or 2b') comes in contact with the contact 4' (or 5') on the inclined portion 1c' (or 1d'). When the conductor 6' on the arm of the rotatable member 2' comes in contact with the contact 4b', the upper surface of the conductor 6' (or 7') on the rotatable member 2' is also brought into contact with one of the contact lugs 8a', 9a'; 8b', 9b'; 8c', or 9c' on the contacts 8' and 9' secured to the stationary plate 3'. Thus, the contact 4' (or 5'), conductor 6' (or 7') and contact 8' (or 9') are all brought into the complete contact with one another by the firm engagement of the pawl-like teeth 2c' on the rotatable member 2' and the pawl-like teeth 3a' on the stationary plate 3'. At this time, the cord 12' is not only locked in a desired extended position, but a complete electric circuit is also established between the contacts enumerated hereinabove, which is partly shown in FIG. 15.

Thus, energization is effected from the cord 12' to the leads 14' and 15', or from the leads 14' and 15' to the cord as desired.

Next, in taking up the cord 12' onto the reel after the use of the reel, the cord is pulled a little in the pulling direction and released slowly. Then the drum hub 1' will recede into the position where the hub 1' is spaced from the position in which the rotatable member 2' is urged towards the stationary plate 3' so that under the influence of spring 10' the arm 2a' (or 2b') of the rotatable member 2' will slide down the projection 1c' (or 1d') so that the conductor 6' (or 7') of the rotatable member will separate from the contact lugs 8a', 9a'; 8b'; 8c', 9c' on the contact 8' and 9' on the stationary plate and also separate from the contact 4' (or 5') on the drum hub of the reel. Consequently, the rotatable member and the conductors thereon rests on the seat 11a' at the bottom of the shaft 11'. Thus, the connections are completely broken.

Figure 16:
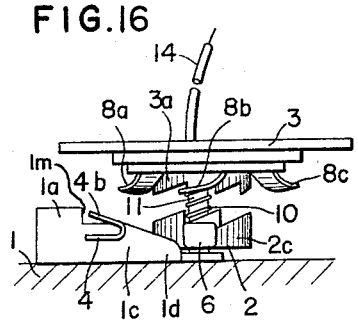
FIG. 16 is a side view, partly broken away, of the apparatus of FIGS. 9–14 with the parts in the disconnected condition.

Accordingly, when the cord 12' is pulled a little, and then released or taken up slowly, the locked condition of the reel is released and at the same time the electric circuit is disconnected. After the circuit has been disconnected, if the cord is slowly taken up by the reel, the rotatable member 2' occupies a stable position on the seat 11a' at the foot of the shaft 11 so that the arm 2a' (or 2b') of the rotatable member 2' will not land on the inclined entrance portion 1e (or 1f'), because the reverse or taking up rotation of the reel 1' is not so sudden as to cause the arm of the rotatable member 2' towards the projection 1a' (or 1b'), even though the rotatable member 2' moves onto the smooth inclined entrance portion 1a' (or 1f'). Thus, the rotatable member 2' is urged towards the circular recess of the drum hub 1' by the tension of the helical spring 10' and the rotatable member 2' with the arms 2a' and 2b' during the reverse or taking up rotation. Consequently, the cord 12' is safely taken up or rewound by the reel owing to the proper rewinding operation of the reel 1', which is clearly shown in FIG. 16.

As fully described in the foregoing, an automatic connecting and disconnecting method and apparatus for effecting the connection of the contacts provided within the reel body can be achieved by the simple operation of a sudden and/or slow release of the cord together with the tension of the spiral spring housed in the drum hub of the cord reel.

Figure 23:
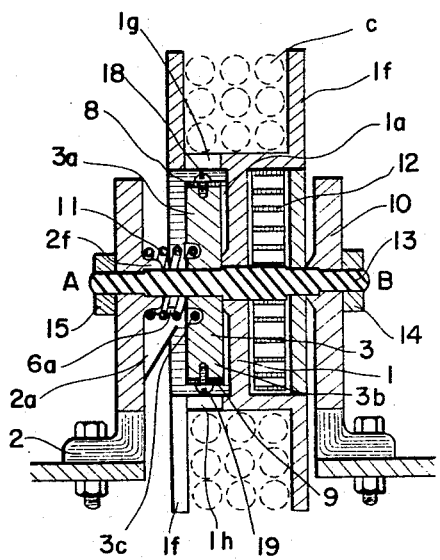
FIG. 23 is a longitudinal sectional view of the cord reel provided with contacts according to this modified embodiment of the invention.

Referring to FIG. 23, the reel of this embodiment of the invention comprises, in order from A to B, a stationary outer cover 2", a helical spring 11", a rotatable member in the form of a rotatable lock means 3", a central drum hub 1", on which the cord C is wound, and rotatably mounted on a central shaft 13", a spiral take-up spring 12" mounted within the spring-chamber of the drum hub 1", and a stationary outer cover 10". The stationary outer covers 2" and 10" are affixed to the central shaft 13" by means of the nuts 14" and 15", respectively. One end of the spiral spring 12" is fastened to the drum hub 1", and the other end thereof is secured to the central shaft 13". The cord C is accommodated within a pair of flange plates 1f" on the drum hub 1". Connecting holes 1g" and 1h" are provided in the drum hub 1" through which the ends of the cord C extend to a contact 5a" provided on the drum hub 1".

One side of the drum hub 1" is recessed to accommodate the rotatable lock means 3" as shown in FIG. 23. FIG. 22 is the plan view of the circular recess on the one side of the drum hub 1".

As shown in FIG. 22, a pair of projecting elements 1a" and 1b" are provided on the end face of the reel formed by the bottom of the circular recess in the drum hub 1" on diametrically opposite sides of the shaft 13". Each element has the same form and the function of the elements is also equivalent, so that a description of either of the elements 1a" or 1b" will suffice. The element 1a" comprises an inclined portion 1c" and the portions, 4", 4a", 4b" and 4c". The portion 4" is a contact, having a contact face 4a" for contact by the contact 8" or 9" of the rotatable conductor and lock member 3", a guide face 4b" for the contact of the rotatable lock 3", and a part 4c" for connecting the cord. The portion 4c" for connecting the cord is fastened to the element 1a" by a screw 16". The projecting element 1b" has a like contact 5" having like parts 5a, 5b" and 5c" thereon. The central shaft 13" extends through a bore 1e" in the center.

Figure 25:
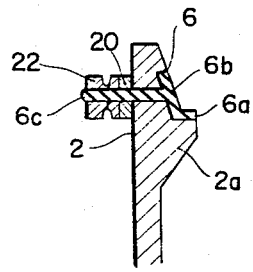
FIG. 25 is a longitudinal sectional view taken along the line A—A of FIG. 24.

Similarly, as shown in FIG. 20, the inner face of the stationary outer cover 2" is provided with a pair of projecting elements 2a" and 2b" lying on a circle on diametrically opposite sides of shaft 13". The elements 2a" and 2b" each has the same form and has the same function so that a description of either 2a" or 2b" will suffice. The sectional view of the element 2a" or 2b" is shown in FIG. 25, in which the element 2a" is shown as having an inclined portion and a contact 6" having one leg 6b" covering a part of the inclined portion. The contact 6" has an L-shaped cross section and the leg 6a" of the L-form contact is adapted to be in contact with the contact 8" or 9" of the rotatable contact and lock member 3", and the one leg 6b" is adapted to guide the contact 8" or 9" of the rotatable contact and lock member 3". From the back side of the portion 6b" extends a screw 6c", and a nut 20" is threaded thereon to hold the contact 6" on projecting element 2a". A nut 22" is threaded onto screw 6c" so as to hold a wire against nut 20". The projecting element 2b" has a like contact 7" thereon with like parts 7a", 7b" and 7c". In FIG. 20, a central aperture 2e" of the stationary outer cover 2" has the central shaft 13" extending therethrough, and a circular groove 2f" around the aperture 2e" is a seat for the helical spring 11".

The rotatable member 3" as illustrated in FIG. 21 has two arms 3a" and 3b". It is made of synthetic plastic or some other insulating material in the form of a bar having an expanded central portion. The ends of two arms 3a" and 3b" are covered with metal contacts 8" and 9" fastened thereto by screws 18" and 19". The metal contacts 8" and 9" of the rotatable member 3 are adapted to come into contact with the metal contacts 4" and 5" of the drum hub 1" of the reel and the metal contacts 6" and 7" of the stationary outer cover 2". A central aperture 3d" in the rotatable lock 3" has the central shaft 13" extending therethrough. A circular groove 3c" around the central aperture 3d" is a seat for the helical spring 11". As shown in FIG. 23, the helical spring 11" is provided between the stationary outer cover 2" and the drum hub 1" of the reel.

The rotatable member 3" is rotatable around the central shaft 13" and it is also movable along the shaft 13".

It will be understood that the longer the length of the cord pulled from the reel, the stronger the rewinding tension of the spiral take-up spring secured in the spring chamber of the drum hub 1" of the reel.

Figure 24:
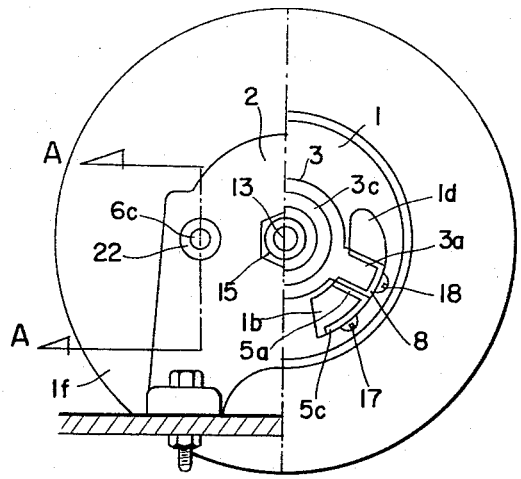
FIG. 24 is a plan view of the cord reel of FIG. 23, with certain parts broken away.

The operation of the device will now be described. The rotatable conductor and lock member 3" is housed in the circular recess of the one side of the drum hub of the cord reel as shown in FIG. 23, and it is always urged into the circular recess by means of the helical tension spring 11". In pulling the cord C from the reel, the rotatable member 3" together with the projecting elements 1a" and 1b", all of which are positioned in the circular recess of the drum hub, are revolved simultaneously in the same direction as the rotation of the reel, for example, clockwise in FIGS. 22 and 24 and in the direction of the bottom of the sheet in FIGS. 17–19. The arms 3a" and 3b" will be abutted by projecting elements 1a" and 1b", as shown in FIG. 17, and member 3" will be rotated. When the cord being pulled is suddenly released, the winding spring 12" will cause the reel to revolve in the rewinding direction opposite to the pulling or unwinding the direction, i.e., counterclockwise in FIGS. 22 and 24. As a result, the rotation of the rotatable lock 3" is stopped, and the rotatable member 3" is held still by the urging of the tension spring 11" placed between the member 3" and the stationary cover 2". Immediately thereafter, the rotatable member 3" is moved towards the stationary cover 2" by reason of the inclined portions 1c" and 1d" affixed to the reel end face the circular recess of the drum hub 1" moving against the arms 3a" and 3b" during the counterclockwise movement of the hub under the rewinding action of the spiral spring 12". As there is a small clearance between the back of the rotatable member 3" and the circular recess of the drum hub, the member 3" is easily shifted toward the stationary cover 2". Subsequently, the rotatable member 3 will be engaged by contacts 4a" and 5a" and will abut the projecting elements 2a" and 2b" provided on the stationary cover 2".

At this time, the rotatable member 3" has moved towards the stationary cover 2" a distance equal to one-half the thickness of the body of the member 3", so both arms 3a" and 3b" are engaged with the projecting elements 2a" and 2b" of the stationary cover 2" so that further rotation of the reel in the counterclockwise rewinding direction will be blocked, as shown in FIG. 18. Moreover, the contacts 6" and 7" affixed to the projecting elements 2a" and 2b" are connected with the contacts 4" and 5" secured in the circular recess in the reel through the contacts 8" and 9" on the rotatable member 3". Thus, the cord C is locked at any desired position and an electric circuit for energization of the apparatus is completed in an automatic manner.

In rewinding the cord C onto the reel after use, it is again pulled in the unwinding or clockwise direction. Upon rotation of the reel due to this pulling on the cord C, the two arms 3a" and 3b" of the rotatable member 3" are released from the engagement between the projecting elements 1a" and 1b" and the cooperating projecting elements 2a" and 2b" with the result that the rotatable member 3 again is clear of the projecting elements and it is urged by the helical spring 11" away from the stationary cover 2" towards the drum hub 1".

Thus, the contacts 6" and 7" on the stationary cover 2", the contacts 8" and 9" on the rotatable lock 3", and the contacts 4" and 5" in the circular recess of the drum hub 1" of the reel are separated from one another.

Further, when the cord C which has been unwound from the reel is gradually allowed to be taken up or rewound on the reel in the counterclockwise diection by the tension of the spiral spring 12", the two arms 3a" and 3b" which have been separated from the projecting elements 1a" and 1b" are rotated in the rewinding or counterclockwise direction by the tension of the spiral spring 12" because they are engaged by the inclined guide portions 1c" and 1d". However, in this event, since the rotatable member 3" is urged towards the circular recess by the helical spring 11", it will not be moved towards the direction of the stationary cover 2" by the inclined guide portions 1c" and 1d", and the cord C will be taken up or rewound onto the reel with all of the contacts completely separated and disconnected.

As fully described in the foregoing, by the method and apparatus in accordance with the preferred embodiment of the invention, two functions can be easily effected; automatic connecting of the electric contacts after the cord on the reel has been partly unwound, and automatic disconnecting of the electric contacts by a simple operation imparted to the cord as it is being pulled. Furthermore, energization from either the contacts 6" and 7" of the stationary part or the contacts 4" and 5" of the rotatable part is effected so that more benefit can be obtained from this invention.

It will be apparent that various changes may be made in the form, construction and arrangement of the parts without departing from the spirit and scope of the invention, the forms hereinbefore described being merely preferred embodiments thereof.

I claim:

1. A spring-wound cord reel for an electric cord having at least one electric conductor therein, comprising a reel member having a hub, winding spring means in said hub for rotating said reel in the winding direction when a cord on the reel has been unwound by rotating the reel member in the unwinding direction, and automatic electric connecting and disconnecting means comprising a plurality of projecting elements at least as great in number as the number of conductors in the cord and mounted on an end face of said reel, each projecting element having in inclined portion thereon inclined to the end face of the reel, said inclined portions each extending from the projecting element in the winding direction of the reel, and a portion on the end of the inclined portion farthest from the end face of the reel which is perpendicular to the end face of the reel, a contact on the outer end of each projecting element, the respective contacts being adapted to be connected to the conductors in the electric cord, a relatively rotatable electric conductor and lock means freely rotatably mounted on said hub and mounted on said hub for relative movement in the direction of the axis of said hub toward and away from said hub, spring means engaged with said electric conductor and lock means urging it toward said hub, a stationary abutment means adjacent and opposed to the face of said hub which has the projecting elements thereon for engaging said electric conductor and lock means when said electric conductor and lock means is engaged with one of said perpendicular portions on the end of one of said projecting elements, said inclined portions on said projecting elements wedging said electric conductor and lock means toward said stationary abutment means when said electric conductor and lock means is rotating relative to said hub, and further contacts on said stationary abutment means in positions to be contacted by said electric conductor and lock means when said electric conductor and lock means abuts said stationary abutment means.

2. A spring-wound cord reel as claimed in claim 1 in which said reel has a recess in the said end face thereof, and said projecting elements and rotatable conductor and lock means are in said recess.

3. A spring-wound cord reel as claimed in claim 1 in which said stationary abutment means comprises a stationary plate having a plurality of teeth thereon, said rotatable conductor and lock means comprising a rotatable member having a pluraly of teeth thereon mating with the teeth on the stationary plate, said stationary plate having the projecting contacts thereon, and said rotatable conductor and lock member further having arms projecting radially thereof with conductors on the ends of said arms adapted to be positioned between the contacts on said stationary plate and the contacts on said projecting elements on said hub.

4. A spring-wound cord reel as claimed in claim 1 in which said stationary abutment means comprises a stationary member, a plurality of projections on said stationary member projecting toward the reel and each having a contact on the end thereof and corresponding in number to the number of projecting elements on said reel, the rotatable conductor and lock means comprising a rotatable member having arms thereon projecting radially thereof with conductors on the ends of the arms, the contacts on the projecting elements on the hub and the stationary member and the contacts on the arms all being at the same radial distance from the axis of the hub.

5. A spring-wound cord reel as claimed in claim 3 in which the contacts on the projecting elements on the reel face in one rotational direction of the reel and are at the outer end of the inclined portion of the projecting elements, and the contacts on the projecting elements on the stationary member face in the opposite rotational direction.

6. A spring-wound cord reel for a cord, comprising a reel member having a hub, winding spring means in said hub for rotating said reel in the winding direction when a cord on the reel has been unwound by rotating the reel member in the unwinding direction, and automatic reel locking means comprising a plurality of projecting elements mounted on an end face of said reel, each projecting element having an inclined portion thereon inclined to the end face of the reel, said inclined portions each extending from the projecting element in the winding direction of the reel, and a portion on the end of the inclined portion farthest from the end face of the reel which is perpendicular to the end face of the reel, a relatively rotatable lock means freely rotatably mounted on said hub and mounted on said hub for relative movement in the direction of the axis of said hub toward and away from said hub, spring means engaged with said lock means urging it toward said hub, and a stationary abutment means adjacent and opposed to the face of said hub which has the projecting elements thereon for engaging said lock means when said lock means is engaged with one of said perpendicular portions on the end of one of said projecting elements, said inclined portions on said projecting elements wedging said lock means toward said stationary abutment means when said lock means is rotating relative to said hub.

7. A spring-wound cord reel as claimed in claim 6 in which said reel has a recess in the said end face thereof, and said projecting elements and rotatable lock means are in said recess.

8. A spring-wound cord reel as claimed in claim 6 in which said stationary abutment means comprises a stationary plate having a plurality of teeth thereon, said rotatable lock means comprising a rotatable member having a plurality of teeth thereon mating with the teeth on the stationary plate, and said rotatable lock member further having arms projecting radially thereof engageable with the projecting elements on said end face of said reel.

No references cited.

ROBERT K. SCHAEFER, *Primary Examiner.*